(12) United States Patent
Derks et al.

(10) Patent No.: US 11,321,456 B2
(45) Date of Patent: May 3, 2022

(54) METHOD AND SYSTEM FOR PROTECTING A MACHINE LEARNING MODEL AGAINST EXTRACTION

(71) Applicant: NXP B.V., Eindhoven (NL)

(72) Inventors: Gerardus Antonius Franciscus Derks, Dongen (NL); Brian Ermans, 's-Hertogenbosch (NL); Wilhelmus Petrus Adrianus Johannus Michiels, Reusel (NL); Christine van Vredendaal, Eindhoven (NL)

(73) Assignee: NXP B.V., Eindhoven (NL)

( * ) Notice: Subject to any disclaimer, the term of this patent is extended or adjusted under 35 U.S.C. 154(b) by 609 days.

(21) Appl. No.: 16/414,068

(22) Filed: May 16, 2019

(65) Prior Publication Data

US 2020/0364333 A1 Nov. 19, 2020

(51) Int. Cl.
*G06F 21/52* (2013.01)
*G06N 3/08* (2006.01)
*G06F 21/55* (2013.01)

(52) U.S. Cl.
CPC ............ *G06F 21/554* (2013.01); *G06F 21/52* (2013.01); *G06N 3/08* (2013.01); *G06F 2221/033* (2013.01)

(58) Field of Classification Search
CPC .. G06F 21/554; G06F 21/52; G06F 2221/033; G06N 3/08
See application file for complete search history.

(56) References Cited

U.S. PATENT DOCUMENTS

| 8,200,812 | B2 | 6/2012 | Anderson et al. |
| 8,671,385 | B2 | 3/2014 | Byrd et al. |
| 8,832,063 | B1 | 9/2014 | Dean |
| 9,313,604 | B1 | 4/2016 | Holcombe |
| 2019/0050564 | A1 | 2/2019 | Pogorelik et al. |

OTHER PUBLICATIONS

Wiggers et al., IBM's AI watermarking method protects models from theft and sabotage, https://venturebeat.com/2018/07/20/ibms-ai-watermarking-method-protects-models-from-theft-and-sabotage/, Jul. 20, 2018 (Year: 2018).*

(Continued)

*Primary Examiner* — Theodore C Parsons
*Assistant Examiner* — Howard H. Louie
(74) *Attorney, Agent, or Firm* — Daniel D. Hill

(57) ABSTRACT

A method for protecting a machine learning (ML) model is provided. During inference operation of the ML model, a plurality of input samples is provided to the ML model. A distribution of a plurality of output predictions from a predetermined node in the ML model is measured. If the distribution of the plurality of output predictions indicates correct output category prediction with low confidence, then the machine learning model is slowed to reduce a prediction rate of subsequent output predictions. If the distribution of the plurality of categories indicates correct output category prediction with a high confidence, then the machine learning model is not slowed to reduce the prediction rate of subsequent output predictions of the machine learning model. A moving average of the distribution may be used to determine the speed reduction. This makes a cloning attack on the ML model take longer with minimal impact to a legitimate user.

20 Claims, 6 Drawing Sheets

(56) References Cited

OTHER PUBLICATIONS

Hendrycks et al., A Baseline for Detecting Misclassified and Out-of-Distribution Examples In Neural Network, International Conference on Learning Representations, 2017 (Year: 2017).*
Abadi, Martin et al.; "TensorFlow: Large-Scale Machine Learning on Heterogeneous Systems;" Submitted on Mar. 14, 2016; arXiv.org > cs > arXiv:1603.04467.
Chakraborty, Anirban et al.; "Adversarial Attacks and Defences: a Survey;" Sep. 28, 2018; arXiv.org > cs > arXiv:1810.00069.
Lee, Taesung et al.; "Defending Against Machine Learning Model Stealing Attacks Using Deceptive Perturbations" Dec. 13, 2018; arXiv.org > cs > arXiv:1806.00054.
Tramer, Florian et al.; "Stealing Machine Learning Models via Prediction APIs;" Proceedings of 25th USENIX Security Symposium, Aug. 10-12, 2016, Austin, TX.

* cited by examiner

METHOD AND SYSTEM FOR PROTECTING A MACHINE LEARNING MODEL AGAINST EXTRACTION

BACKGROUND

Field

This disclosure relates generally to machine learning, and more particularly, to a method and system for protecting a machine learning model against extraction.

Related Art

Machine learning is becoming more widely used in many of today's applications, such as applications involving forecasting and classification. Generally, a machine learning (ML) model is trained, at least partly, before it is used. Training data is used for training an ML model. Machine learning models may be classified by how they are trained. Supervised learning, unsupervised learning, semi-supervised learning, and reinforcement learning are examples of training techniques. The effectiveness of the ML model is influenced by its accuracy, execution time, storage requirements, and the quality of the training data. The expertise, time, and expense required for creating and training a machine learning model using this training data results in the ML model being a valuable asset.

Protecting an ML model from attacks has become a problem. When machine learning is provided as a service, a user only has access to the inputs and outputs of the model. Model extraction is an attack that results in a copy of the ML model having nearly identical input/output behavior. To extract the model when the machine learning model is provided as a service, valid queries are provided to the model and the resulting output is compiled and used for training the copy. Even when an attacker is just given access to the inputs and outputs, the machine learning model can be relatively easily copied. Black box access to the model does not provide sufficient protection against model extraction. Also, a black box may not always be available to protect the model. Once an attacker has copied the model, it can be used without permission or authorization and even monetized by the attacker.

Therefore, a need exists for a method to better protect a machine learning model against extraction.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
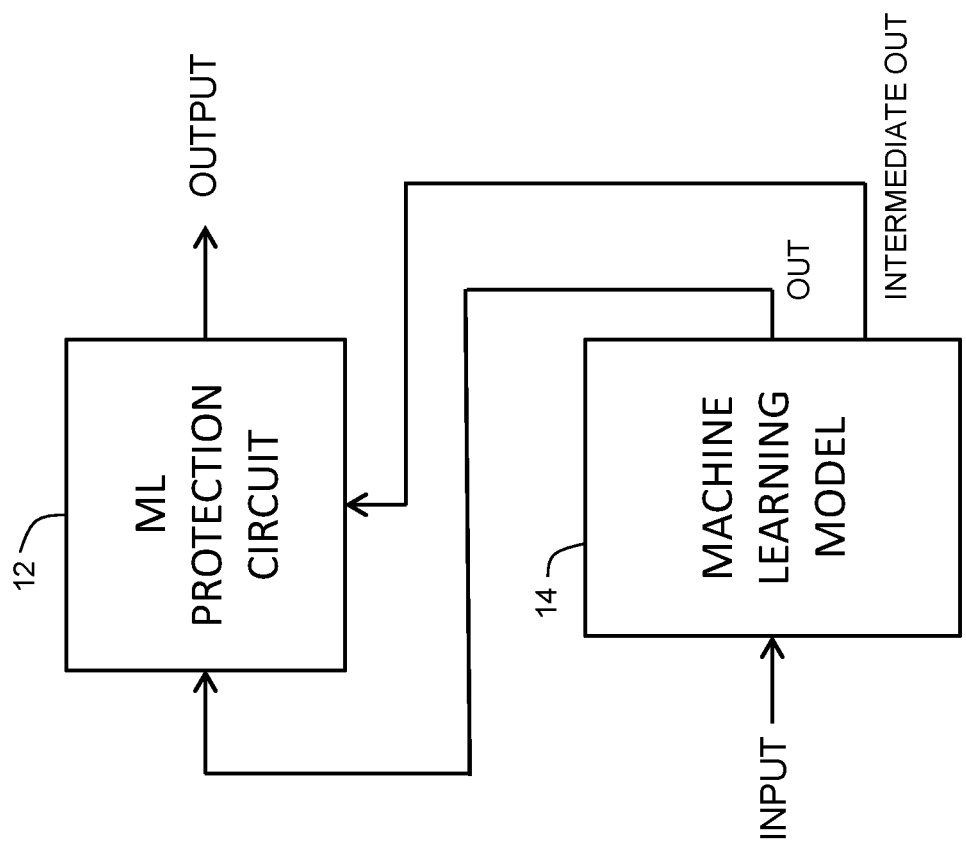
FIG. 1 illustrates a machine learning system in accordance with an embodiment.

Generally, there is provided, a method and system for protecting a machine learning model against extraction. The model is protected during inference operation from an attacker that has access to at least the inputs and outputs of the model. In one embodiment, the ML model is protected by a throttling mechanism. The throttling mechanism is provided to restrict, or slow down, the prediction speed during inference operations when input samples indicate an attack on the model. The throttling may be based on detecting narrowing or widening distribution of the inputted values to the model. In another embodiment, the throttling may be based on a confidence value corresponding to each output prediction. A moving average of the distribution may be used to detect if the input values are non-problem domain inputs from an attacker or an occasional non-problem domain input from a legitimate user. A wide distribution of output predictions with too many non-problem domain input samples may indicate an attack on the model and will result in the prediction rate for output prediction categories being provided more slowly so more time will be required to extract the model. If the distribution subsequently narrows to the problem domain, indicating a trend of more correct predictions, the prediction rate of output categories will speed up. In one embodiment, to prevent a situation where both legitimate and illegitimate users are inputting samples concurrently, users could be required to authenticate themselves so that moving averages are calculated per user and the prediction rate is determined on an individual basis. It is possible that the attacker has legitimate access to the ML model. In one embodiment, the predetermined nodes for detecting the distribution may be from the last hidden layer before the output layer in a neural network. In another embodiment, the predetermined nodes may be from any layer of the neural network including the input and output layers. The firing rate of the predetermined nodes may also be used in connection with the distribution of output predictions to throttle the outputs if an attack is detected, thus limiting the speed of the ML model inference operations during the attack. If the confidence values at the predetermined nodes are relatively low with a relatively high firing rate, then the throttling mechanism determines that an attack is occurring and slows down the outputs. Conversely, outputs from the model with high confidence, such as outputs in response to a legitimate user, do not slow the model, or only slow the model prediction rate very mildly, or unnoticeably.

Slowing the output predictions may make model extraction too time consuming and therefore not worthwhile for an attacker. Also, implementation of the described throttling mechanism does not affect the accuracy of the machine learning model being protected.

In accordance with an embodiment, there is provided, a method for protecting a machine learning model, the method including: providing a machine learning model; during inference operation, providing a plurality of input samples to the machine learning model; receiving a plurality of output predictions from a predetermined node in the machine learning model in response to the plurality of input values; and measuring a distribution of the plurality of output predictions from the predetermined node, if the distribution of the plurality of output predictions indicates correct output category prediction with low confidence, then the machine learning model is slowed to reduce a prediction rate of subsequent output predictions of the machine learning model; and if the distribution of the plurality of predictions indicates correct output category prediction with a high confidence, then the machine learning model is not slowed to reduce the prediction rate of subsequent output predictions of the machine learning model. The method may further include: computing a moving average of the distribution over a predetermined number of output category predictions from one user; and using the resulting moving average to determine a speed of the output category predictions. The machine learning model may include a neural network, decision tree, random forest, or support vector machine. The predetermined node may be characterized as being a node in a last hidden layer before an output layer of the neural network. The prediction rate may be slowed by providing a hidden layer of delay nodes in the neural network. The delay nodes each may further include a feedback loop with a delay element. Measuring a distribution may further include comparing each of the plurality of output predictions to a threshold. How much the prediction rate is slowed may be proportional to a moving average of a plurality of output predictions from an intermediate layer of the machine learning model. The predetermined node may be an output node of the machine learning model.

In another embodiment, there is provided a method comprising: providing a machine learning model; during inference operation, providing a plurality of input samples to the machine learning model; determining an output prediction category for each of the plurality of input samples; and determining a distribution of a plurality of output predictions from a predetermined node of the machine learning model, if the distribution of the plurality of output predictions indicates correct output category prediction with a confidence at least as high as a confidence of a previously generated output prediction, then a prediction rate of subsequently generated output values of the machine learning model is not reduced, and if the distribution of the plurality of output predictions indicates correct output category prediction with a lower confidence than a confidence of a previously generated output prediction, then the machine learning model is slowed to reduce the prediction rate of subsequently generated output predictions. The machine learning model may include one of a neural network, decision tree, random forest, or support vector machine. The predetermined node may be characterized as being a node in a last hidden layer before an output layer of the neural network. The prediction rate may be slowed by providing a hidden layer of delay nodes in the neural network. The delay nodes each may further include a feedback loop with a delay element. The prediction rate may be proportional to a moving average of the distribution of the plurality of output predictions, wherein the prediction rate may be decreased for widening distribution and increased for narrowing distribution. The prediction rate may be proportional to a moving average of the confidences of previously generated output predictions.

In yet another embodiment, there is provided, a machine learning system, comprising: a machine learning model for generating output category predictions corresponding to input samples received by the machine learning model; and a machine learning protection circuit for receiving the output category predictions from the machine learning model, and in response, determining a distribution of the output category predictions, wherein a prediction rate of subsequently generated output category predictions is determined by the distribution of previously generated output category predictions, wherein determining the distribution is widening decreases the prediction rate and determining the distribution is narrowing does not decrease the prediction rate. The machine learning model may be one of either a neural network, a decision tree, a random forest, or a support vector machine. The predetermined node may be characterized as being a node in a last hidden layer before an output layer of the machine learning model. The prediction rate may be proportional to a moving average of the distribution, wherein the prediction rate may be decreased for a widening moving average of the distribution and not decreased for a narrowing moving average of the distribution.

Machine learning models learn a function which correctly maps a given input value to an output value using training data. The learned function can be used to categorize new data, for example, photos or pictures of dogs and cats. After training, the ML model can be used in inference operation to make predictions about input samples it receives. The normal type of valid input sample that correctly fits within one of the categories the model is trained for may be referred to as a problem domain input. In contrast, an input sample that is unrelated to the intended use of the model may be referred to as a non-problem domain input sample. A non-problem domain input is not expected to be processed correctly by a ML algorithm. For example, if an ML model classifies images of cats and dogs, a possible non-problem domain input would be an image of a giraffe, which is neither a dog or cat. Generally, a machine learning model cannot distinguish from problem domain input samples and non-problem domain input samples and will attempt to provide an output value for every input sample that is received. Some ML modes will also provide a confidence value to represent the possible correctness of the output prediction. The confidence value may be based on a distribution sampling of a large number of input samples, where output values for correct output categories fall within a relatively narrow distribution and more incorrect output categories fall in a wider distribution outside of the relatively narrow distribution.

In a machine learning model implemented remotely, such as in the cloud or in a black box, access is only available to the inputs and outputs of the model. A goal of model extraction, or model cloning, is to extract the functionality of the ML model as accurately as possible by providing queries to the machine learning model and storing the returned outputs. The resulting input/output pairs of data can be used to train another machine learning model which in terms of functionality is close to the original model. Hence, the cloned model is likely to work correctly for the original input values.

A legitimate user is expected to mostly input samples that fall within a problem domain. In a cloning attack, the attacker may use a large number of non-problem domain input samples. As described below, to make copying of the model more difficult, the prediction speed of the model is slowed for queries to the model that are outside of the problem domain distribution. Slowing the output predictions will make extraction of the model take significantly longer, thus increasing the effort and time to make a cloning attack. The lower the confidence in output predictions, the longer an attack will take. This might make the effort not worthwhile for the attacker.

FIG. 1 illustrates machine learning system 10 in accordance with an embodiment. Machine learning system 10 includes ML protection circuit 12 and ML model 14. Machine learning model 14 may be any type of machine learning model, such as for example, a neural network, decision tree, random forest, or support vector machine. Machine learning model 14 receives input samples labeled "INPUT", classifies the input samples by category and provides a classification or category of the input sample. In some embodiments, the ML model may also provide a confidence level of the correctness of the output category. Machine learning protection circuit 12 is coupled to receive an output signal "OUT" from ML model 14. Also, ML protection circuit 12 is coupled to receive a signal labeled "INTERMEDIATE OUT." Signal INTERMEDIATE OUT may be one or more signals from other nodes in the ML model, such as nodes from the input layer, hidden layers, and output layer of ML model 14. In one embodiment, ML model 14 includes a neural network and INTERMEDIATE OUT may be a signal from a hidden layer of the neural network. The hidden layer may be a final hidden layer before the output layer. In another embodiment, the INTERMEDIATE OUT signal may be from a different layer or node(s) of a machine learning model.

During inference operation, ML protection circuit 12 receives signals INTERMEDIATE OUT from a predetermined hidden layer and measures a distribution of the INTERMEDIATE OUT signals. In addition, ML protection circuit 12 determines a firing rate of the hidden nodes corresponding to INTERMEDIATE OUT signals. If the measured distribution of the INTERMEDIATE OUT signals indicates a high percentage of the input samples are outside of the problem domain, that is, with low confidence, then the machine learning model is slowed to reduce a prediction rate of subsequent output values of signal OUTPUT provided by the ML model. If the measured distribution of the input sample indicates correct output category prediction with a relatively high confidence, then the ML model is not slowed to reduce the prediction to reduce the prediction rate of subsequent output values of the ML model, and the output categories OUTPUT are allowed to pass without being slowed. If the model had been previously slowed, and subsequently a higher number of output predictions are provided with high confidence, then the rate of output predictions may be increased.

Figure 2:
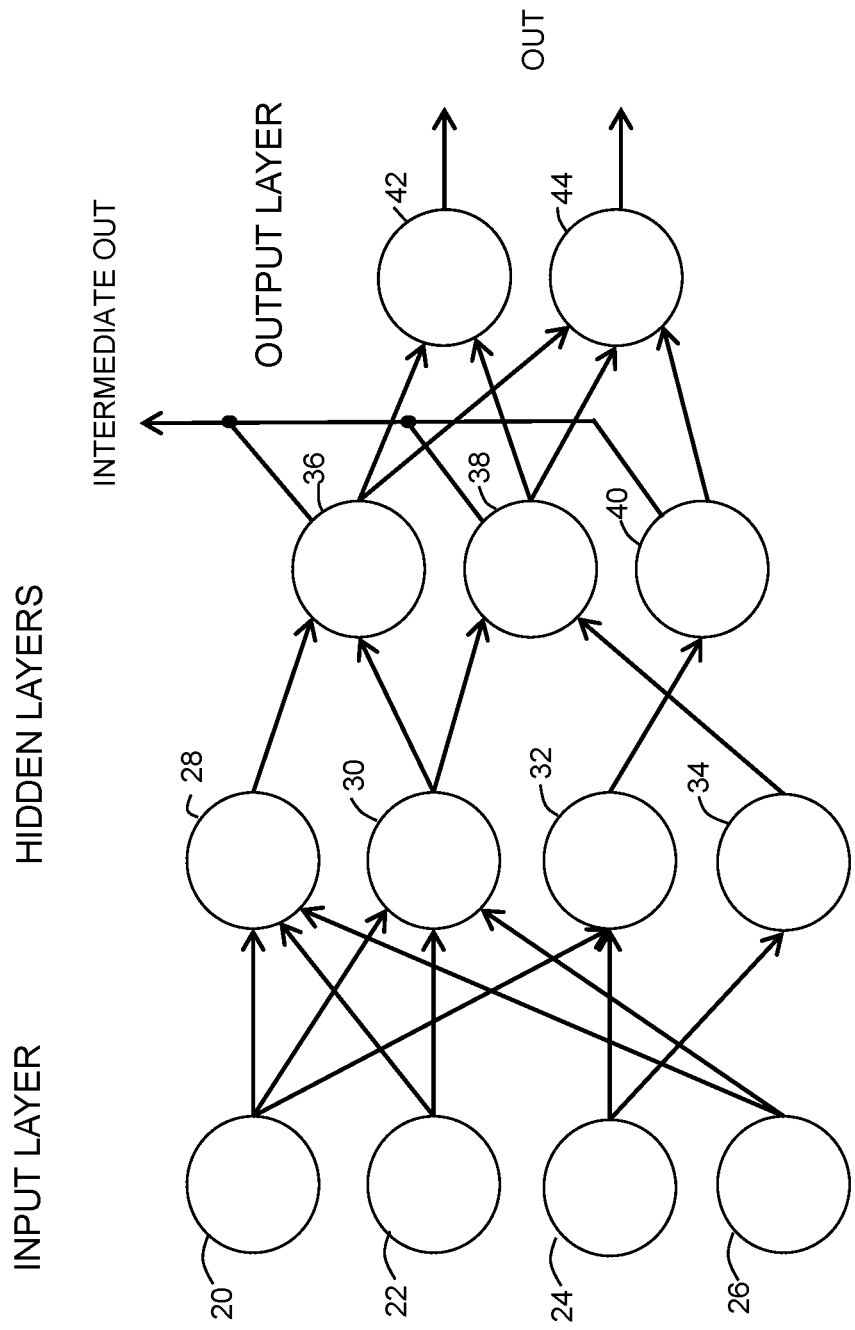
FIG. 2 illustrates a neural network for use in the machine learning model of FIG. 1 in accordance with an embodiment.

FIG. 2 illustrates a neural network for use in machine learning model 14 of FIG. 1 in accordance with an embodiment. A neural network normally includes a plurality of nodes organized as an input layer, one or more hidden layers, and an output layer. The neural network of FIG. 2 has two hidden layers. Nodes 20, 22, 24, and 26 are nodes of an input layer, nodes 28, 30, 32, 34 are one hidden layer, while nodes 36, 38, and 40 are a final hidden layer before the output layer. The output layer includes nodes 42 and 44. Arrows between the nodes represent prediction paths that result from training the ML model. Output predictions OUT are provided from output nodes 42 and 44. In some embodiments, the output predictions may be accompanied by confidence levels.

As illustrated in FIG. 2, signals INTERMEDIATE OUT are provided from final hidden layer nodes 36, 38, and 40 to ML protection circuit 12 (FIG. 1). In other embodiments, output signals from any of the other layers may be used. For example, in one embodiment, output throttling may be controlled based on output categories from output nodes 42 and 44.

As an example, one well known training data set is the Pima-Indians-Diabetes data set. This training set has 768 records with 8 numeric attributes, and the objective is to decide whether a patient will suffer an onset of diabetes within 5 years of when the measurements were taken. A neural network can be trained with this data set and other data sets.

A function may be defined that takes as input the firing rate of each node in, for example, the final hidden layer. The function g computes a moving average m over the distribution of the firing rates that have been measured over n previous inference operations by the same user of the ML model. The output of g is the duration that the ML-algorithm waits before returning the result of the inference operation. A wider distribution of INTERMEDIATE OUT categories from one of the final layers of the model leads to longer waiting times than a narrower distribution. Alternately, if the signal INTERMEDIATE OUT is from an earlier layer in the model and the input samples are non-problem domain samples, then a rate of firing for the nodes of the layer has a wider distribution, and the waiting time will be made to be longer. The function g is transformed by applying (learned) parameters such that the intensity of the throttling is well proportionate to the moving average of the measurements. Using a moving average may be desirable because this makes the throttling tolerant of honest users who occasionally issue a query for which the output of the model has a non-malicious low-confidence level. Successive queries with low confidence are probably from an attacker and will cause a shift in the moving average and will result in increased throttling, and thus, slower inference operation. In this embodiment, a moving average m constitutes the mean of the variance of the firing rates of the nodes in the output layer over n inference operations. The following equations define the function g that may be used in one embodiment where m is the moving average of the variance of the firing rates A. Hence, $A_k$ is the distribution of firing rates at the output layer for inference operation k. Parameters a, b, c and d need to be chosen appropriately for the problem and may be learned.

$$m = \frac{1}{n}\sum_{i=0}^{n-1} \mathrm{Var}(A_{n-i})$$

$$g(m) = \max(0, d \cdot \exp(a(m-b)+c))$$

The actual waiting within the inference algorithm can be implemented using timeouts or within the neural network itself using an internal feedback loop that loops some number of times depending on the output of g.

The resulting effect of the throttling is that queries for which the distribution of the (raw) prediction values is wider, which is a signal for low confidence, the inference will cost more time than for queries for which this distribution is more concentrated, or narrow. The throttling is used to make it more difficult for an attacker to issue queries to the ML algorithm that result in unusual output values (or intermediate values) as is more likely to happen for fully random input. An attacker conducting a cloning attack needs outcomes for queries that thoroughly cover the entire input space for the model because obtaining the true input distribution for the real problem requires too much effort. Queries that are outside of the real input distribution have a higher chance of having high variance (low confidence) in the (intermediate) firing rates. Therefore, the speed of the network for low confidence queries that are outside of the real input distribution is limited, or throttled, thereby increasing the required effort for a cloning attack. Depending on the values of a, b, c and d, conducting an attack will take longer.

The worse the confidence in the queries, the longer the attack will take. This factor in attack costs might make the effort not worth it for an attacker. Note that if an attacker chooses to alternate, e.g., 9 queries that it knows will result in a high confidence with 1 new query that results in a low confidence, this will slow down the attacker with at least a factor 10 in attack speed.

An advantage of throttling as described is that unlike techniques that involve rounding or noise, the accuracy of the original model is not affected. If a user issues genuine queries that the network is not confident of, the inference operation will take longer than usual, but the results will be unaltered.

A waiting time in response to the throttling may be implemented in many ways. For example, the waiting time may be implemented within an inference algorithm using timeouts. In another embodiment, the waiting time may be implemented using a delay implemented within the ML model.

Figure 3:
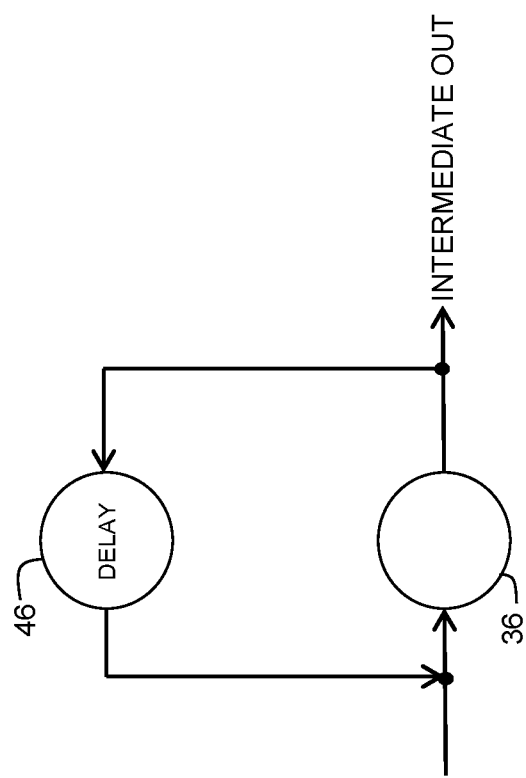
FIG. 3 illustrates an example delay element for use with the neural network of FIG. 2.

FIG. 3 illustrates one example of a delay element for use with the neural network of FIG. 2. Delay elements may be inserted in all the nodes of one or more hidden layers in the neural network of FIG. 2. As one example, delay element 46 is illustrated providing a feedback path from the output to the input of node 36 of FIG. 2. Delay elements would also be included with nodes 38 and 40. The delay elements may selectively introduce delay using a function in delay element 46 that requires time to compute but does not affect the results. As discussed above, the delay is provided to add waiting time to prediction result outputs when the model is perceived to be under a cloning attack.

Figure 4:
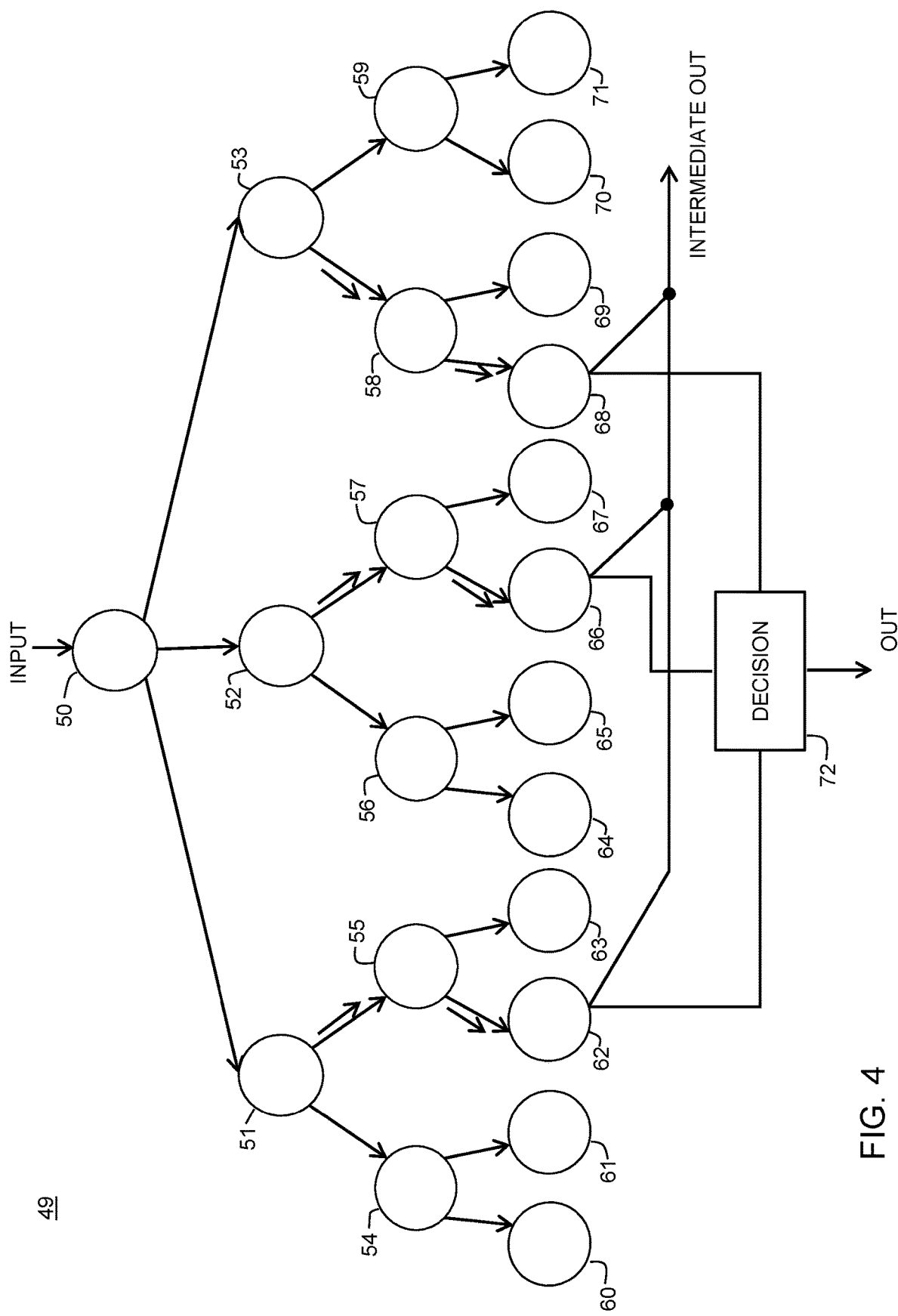
FIG. 4 illustrates a decision tree for use in the machine learning model of FIG. 1 in accordance with another embodiment.

FIG. 4 illustrates decision tree 49 for use in the machine learning model 14 of FIG. 1 in accordance with another embodiment. Decision tree 49 may be implemented in ML system 10 similarly to the neural network of FIG. 2. Decision tree 49 includes an input node 50, branch nodes 51-59, and leaf nodes 60-71, connected by arrows. During an inference operation of decision tree 49, potential paths are indicated with the smaller arrows and the possible output categories are provided to a decision block 72. Decision block 72 may use a majority vote to determine an output category that is provided as signal OUT. In accordance with an embodiment, an intermediate output signal INTERMEDIATE OUT may be taken from the leaf nodes as illustrated and provided to ML protection circuit 12 of FIG. 1. ML protection circuit 12 may then throttle the outputs OUT of decision tree 49 as described above.

Figure 5:
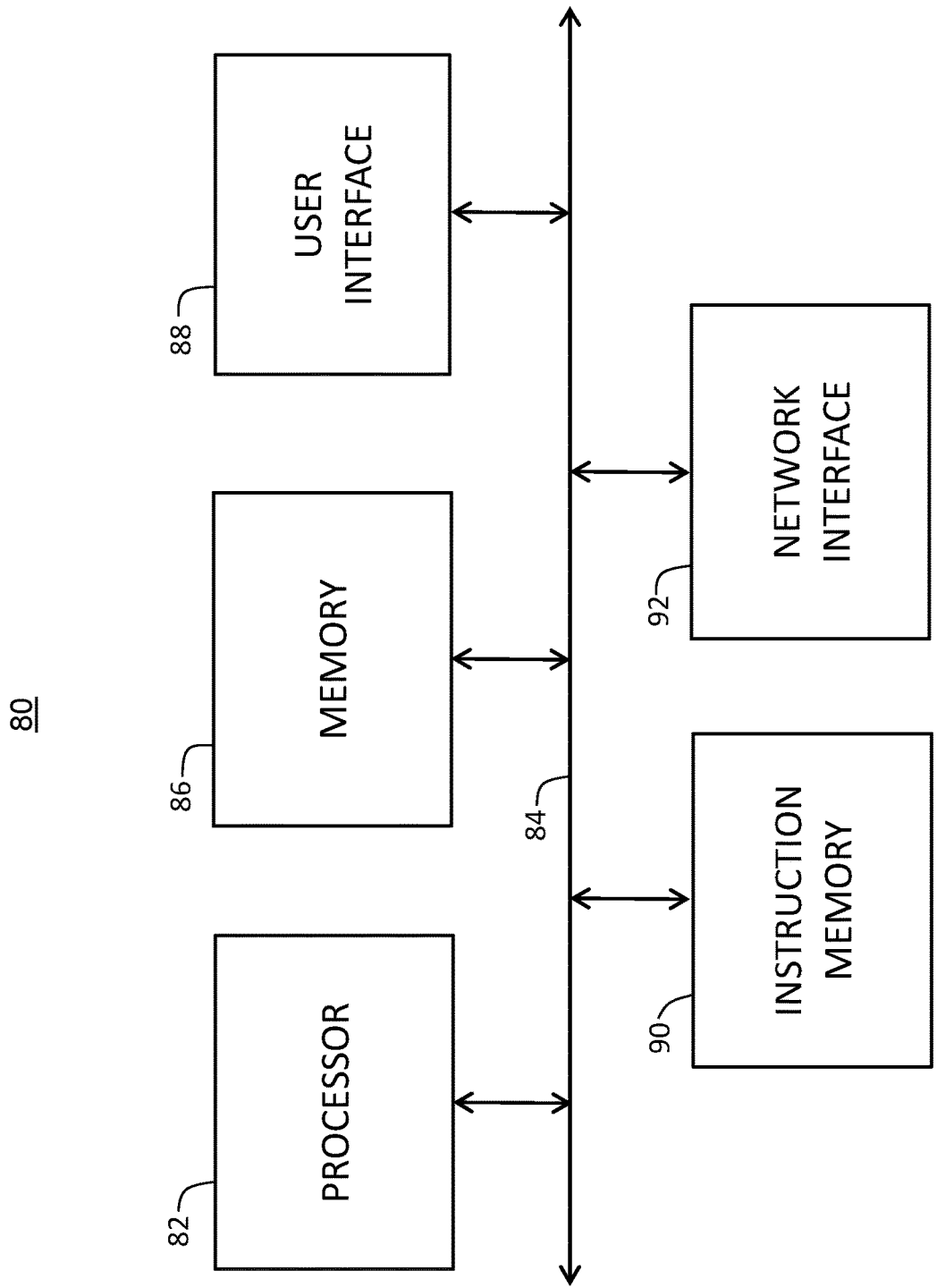
FIG. 5 illustrates a data processing system for implementing the machine learning system of FIG. 1.

FIG. 5 illustrates data processing system 80 for implementing the machine learning system of FIG. 1. Data processing system 80 may be implemented on one or more integrated circuits and may be used in an implementation of the described embodiments. Data processing system 80 includes bus 84. Connected to bus 84 is processor 82, memory 86, user interface 88, instruction memory 90, and network interface 92. Processor 82 may be any hardware device capable of executing instructions stored in memory 86 or instruction memory 90. For example, processor 82 may execute the machine learning algorithms using training data stored in memory 86. Processor 82 may have multiple processing cores. Processor 82 may be, for example, a microprocessor, field programmable gate array (FPGA), application-specific integrated circuit (ASIC), or similar device. Processor 82 may be implemented in a secure hardware element and may be tamper resistant.

Memory 86 may be any kind of memory, such as for example, L1, L2, or L3 cache or system memory. Memory 86 may include volatile memory such as static random-access memory (SRAM) or dynamic RAM (DRAM), or may include non-volatile memory such as flash memory, read only memory (ROM), or other volatile or non-volatile memory. Also, memory 86 may be implemented in a secure hardware element. Alternately, memory 86 may be a hard drive implemented externally to data processing system 80. In one embodiment, memory 86 is used to store weight matrices for the ML model.

User interface 88 may be connected to one or more devices for enabling communication with a user such as an administrator. For example, user interface 88 may be enabled for coupling to a display, a mouse, a keyboard, or other input/output device. Network interface 92 may include one or more devices for enabling communication with other hardware devices. For example, network interface 92 may include, or be coupled to, a network interface card (NIC) configured to communicate according to the Ethernet protocol. Also, network interface 92 may implement a TCP/IP stack for communication according to the TCP/IP protocols. Various other hardware or configurations for communicating are available.

Instruction memory 90 may include one or more machine-readable storage media for storing instructions for execution by processor 82. In other embodiments, both memories 86 and 90 may also store data upon which processor 82 may operate. Memories 86 and 90 may store, for example, one or more machine learning models, encryption, decryption, and verification applications. Memory 90 may be implemented in a secure hardware element and be tamper resistant.

Figure 6:
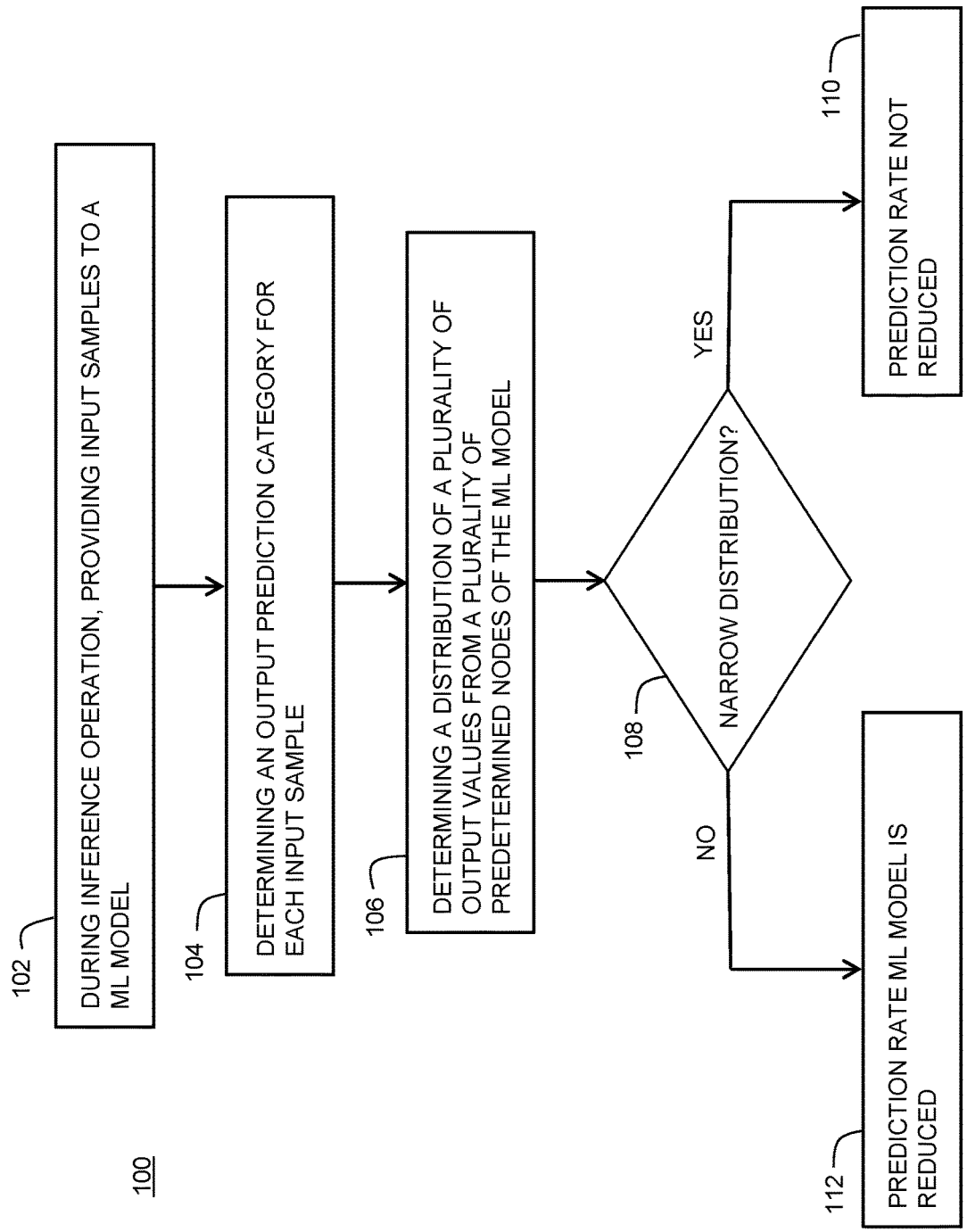
FIG. 6 illustrates a flow chart of a method for protecting a machine learning model in accordance with an embodiment.

FIG. 6 illustrates flow chart 100 of a method for protecting a machine learning model in accordance with an embodiment. Method 100 starts at step 102. At step 102, during inference operation of the ML model, input samples are provided to the ML model. At step 104, an output prediction category OUT is determined for each input sample as illustrated in FIG. 1. At step 106, a distribution is determined for a plurality of output categories from one or more predetermined nodes of the ML model. As described above, the one or more predetermined nodes may be a final hidden layer before the output layer of a neural network. At decision step 108, it is determined if the distribution measured at step 106 is a wider distribution, indicating non-problem domain input samples, or a narrower distribution, indicating problem domain input samples. In one embodiment, the difference between a narrow distribution and a wide distribution may be based on comparison to a threshold. In another embodiment, a moving average of distributions may be used as described above. If, at decision step 108, the distribution is determined to be narrower than a problem domain distribution, the YES path is taken to step 110, and the prediction rate of the ML model is not reduced further. If the distribution is not determined to be narrower, then the NO path is taken to step 112, and the prediction rate is reduced. The prediction rate may be reduced, e.g., by an amount proportional to the moving average of the distribution of a plurality of output category predictions. Also, conversely, if the determined distribution becomes relatively narrower, then the prediction rate may be increased.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for protecting a machine learning model, the method comprising:
   providing the machine learning model;
   during inference operation, providing a plurality of input samples to the machine learning model;
   receiving a plurality of output predictions from a predetermined node in the machine learning model in response to the plurality of input values; and
   measuring a distribution of the plurality of output predictions from the predetermined node,
   if the distribution of the plurality of output predictions indicates correct output category prediction with a confidence below a predetermined threshold, then the machine learning model is slowed to reduce a prediction rate of subsequent output predictions of the machine learning model; and
   if the distribution of the plurality of predictions indicates correct output category prediction with a confidence above a predetermined threshold, then the machine learning model is not slowed to reduce the prediction rate of subsequent output predictions of the machine learning model.

2. The method of claim 1, further comprising:
   computing a moving average of the distribution over a predetermined number of output category predictions from one user; and
   using the resulting moving average to determine a speed of the output category predictions.

3. The method of claim 1, wherein the machine learning model comprises a neural network, decision tree, random forest, or support vector machine.

4. The method of claim 3, wherein the predetermined node is characterized as being a node in a last hidden layer before an output layer of the neural network.

5. The method of claim 3, wherein the prediction rate is slowed by providing a hidden layer of delay nodes in the neural network.

6. The method of claim 5, wherein the delay nodes each further comprise a feedback loop with a delay element.

7. The method of claim 1, wherein measuring a distribution further comprises comparing each of the plurality of output predictions to a threshold.

8. The method of claim 1, wherein how much the prediction rate is slowed is proportional to a moving average of a plurality of output predictions from an intermediate layer of the machine learning model.

9. The method of claim 1, wherein the predetermined node is an output node of the machine learning model.

10. A method comprising:
    providing a machine learning model;
    during inference operation, providing a plurality of input samples to the machine learning model;
    determining an output prediction category for each of the plurality of input samples; and
    determining a distribution of a plurality of output predictions from a predetermined node of the machine learning model,
    if the distribution of the plurality of output predictions indicates correct output category prediction with a confidence at least as high as a confidence of a previously generated output prediction, then a prediction rate of subsequently generated output values of the machine learning model is not reduced, and
    if the distribution of the plurality of output predictions indicates correct output category prediction with a lower confidence than a confidence of a previously generated output prediction, then the machine learning model is slowed to reduce the prediction rate of subsequently generated output predictions.

11. The method of claim 10, wherein the machine learning model comprises one of a neural network, decision tree, random forest, or support vector machine.

12. The method of claim 11, wherein the predetermined node is characterized as being a node in a last hidden layer before an output layer of the neural network.

13. The method of claim 10, wherein the prediction rate is slowed by providing a hidden layer of delay nodes in the neural network.

14. The method of claim 10, wherein one or more delay nodes each further comprise a feedback loop with a delay element.

15. The method of claim 10, wherein the prediction rate is proportional to a moving average of the distribution of the plurality of output predictions, wherein the prediction rate is decreased for widening distribution and increased for narrowing distribution.

16. The method of claim 10, wherein the prediction rate is proportional to a moving average of the confidences of previously generated output predictions.

17. A machine learning system, comprising:
    a machine learning model for generating output category predictions corresponding to input samples received by the machine learning model; and
    a machine learning protection circuit for receiving the output category predictions from the machine learning model, and in response, determining a distribution of the output category predictions, wherein a prediction rate of subsequently generated output category predictions is determined by the distribution of previously generated output category predictions, wherein determining the distribution is widening decreases the prediction rate and determining the distribution is narrowing does not decrease the prediction rate.

18. The machine learning system of claim 17, wherein the machine learning model is one of either a neural network, a decision tree, a random forest, or a support vector machine.

19. The machine learning system of claim 18, wherein a predetermined node is characterized as being a node in a last hidden layer before an output layer of the machine learning model.

20. The method of claim 17, wherein the prediction rate is proportional to a moving average of the distribution, wherein the prediction rate is decreased for a widening moving average of the distribution and not decreased for a narrowing moving average of the distribution.

* * * * *